April 1, 1952     E. D. HADLEY     2,591,426
DIVIDED CAR SEAT
Filed Oct. 25, 1949     2 SHEETS—SHEET 1

Inventor

Earl D. Hadley

By *Clarence A. O'Brien and Harvey B. Jacobson*
Attorneys

April 1, 1952  E. D. HADLEY  2,591,426
DIVIDED CAR SEAT

Filed Oct. 25, 1949  2 SHEETS—SHEET 2

Inventor
Earl D. Hadley

By *Clarence A. O'Brien
and Harvey B. Jacobson*
Attorneys

Patented Apr. 1, 1952

2,591,426

UNITED STATES PATENT OFFICE 2,591,426

DIVIDED CAR SEAT

Earl D. Hadley, Edwardsville, Kans.

Application October 25, 1949, Serial No. 123,499

3 Claims. (Cl. 155—5)

This invention relates to automobile seats, and more particularly, to a divided car seat adapted for use in a coach or club coupe style automobile.

An object of the present invention is to provide a car seat for an automobile which will permit easy access to the door of the automobile to the back seat portion thereof.

A further object of the invention is to provide a novel divided front seat which will permit an occupant of the car to remain seated thereon while another person enters the car into the back seat area.

Still another object of the invention resides in the provision of novel means for urging sections of the front seat to a position forward of other portions thereof so as to provide for easy access into the car.

Other additional objects reside in the provision of a divided front seat for an automobile which is simple in construction, strong, durable, and efficient in operation, and which is relatively inexpensive to manufacture.

These, together with the various ancillary objects of the invention which will later become apparent as the following description proceeds are attained by this divided car seat, a preferred embodiment of which has been illustrated in the accompanying drawings, wherein.

Figure 1:
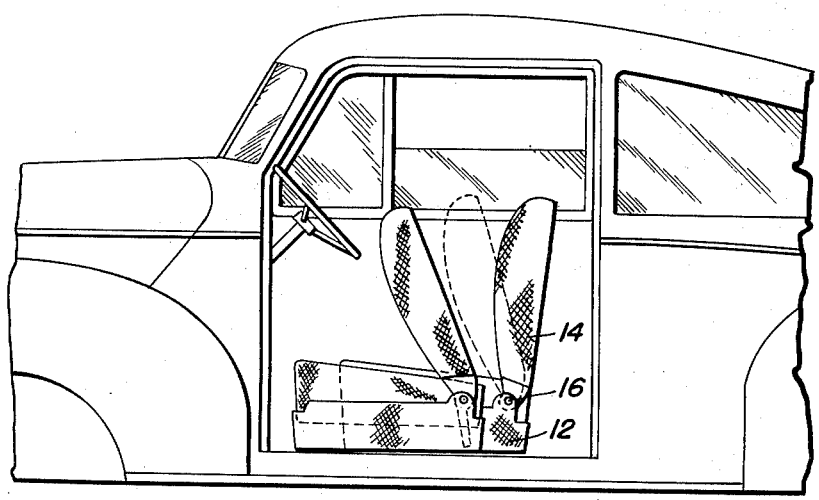
Figure 1 is a side elevational view of the divided car seat shown in position in an automobile.

With continuing reference to the accompanying drawings wherein like reference numerals designate similar parts throughout the various views, 10 generally represents a central seat member including a frame 12 and a cushion 14. Pivotally connected to the frame 12 as by hinges 16 is a central back rest 18.

On either side of the central seat member 10, are end seat members generally designated by reference numerals 20 and 22 comprising frame portions 24 and 26, and cushions 28 and 30. While the frame 12 is rigidly secured to the floor board indicated by reference numeral 32 of the automobile, the end seat members 22 and 20 are attached to the floor board in such a manner as to permit one degree of freedom, that is, sliding movement with respect to the longitudinal axis of the car.

Figure 3:
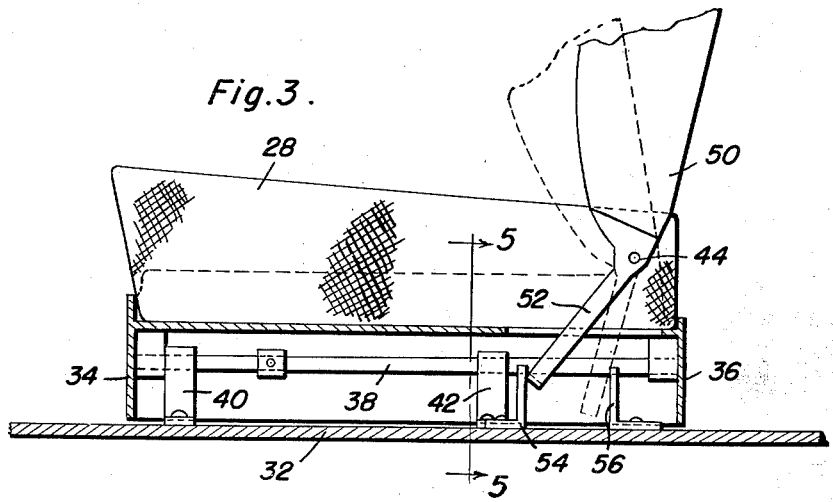
Figure 3 is a vertical sectional view of the divided car seat, in an enlarged scale, to show in greater detail the actuation means for moving the desired section of the car seat forward or rearward.
Figure 5:
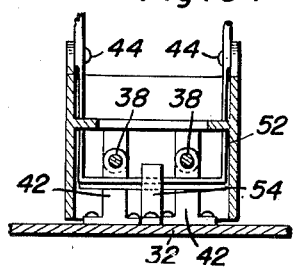
Figure 5 is a vertical sectional view as taken along line 5—5 in Figure 3, with parts being broken away to show other parts in greater detail.
Figure 2:
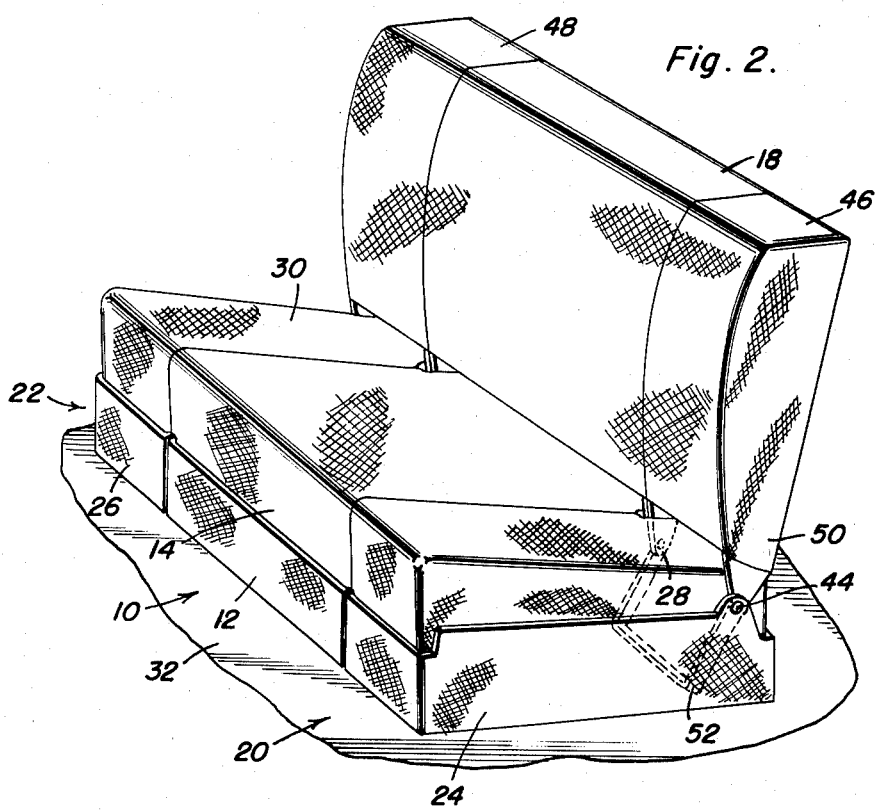
Figure 2 is a perspective view of the divided car seat comprising the present invention.
Figure 4:
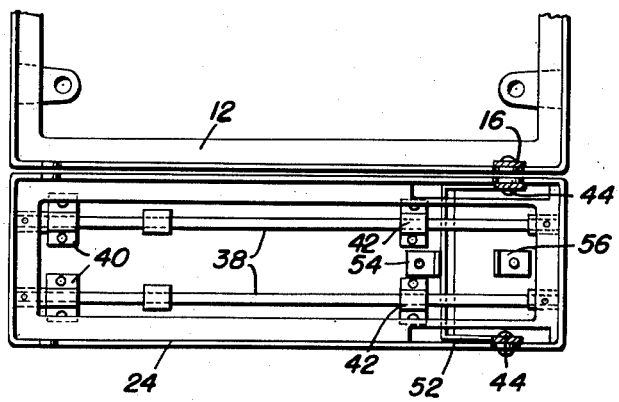
Figure 4 is a top plan view of the front seat frame, parts being broken away to show other parts in greater detail.

Referring now more particularly to Figures 3, 4, and 5, it will be seen that between the front and rear walls of the frame portions 24 or 26 as indicated by numerals 34 and 36, of each of the seat members 20 and 22 there is secured a cylindrical rod 38. The rod 38 is slidably inserted within brackets 40 and 42 or other suitable retainers secured to the floor board 32 of the automobile. This permits relative movement of the rod 38 and hence relative movement of the seat members 20 and 22 relative to the brackets 40 and 42 and relative to the floor board. Of course, as may be desired, a plurality of those rods 38 may be used and as shown in Figures 4 and 5, it has been found that two of these rods securely retain the end seats 20, 22 and restrain them to one degree of freedom. Additionally, while two rods do not increase the frictional resistance to sliding too greatly, more rods 38 may have this deleterious effect.

By means of pins as at 44, end back rests 46 and 48 are secured to the end frame members 24 and 26 in a pivotal or rotatable manner. The back rests 46 and 48 include a back rest frame 50 which has a downwardly extending U-shaped lug 52 attached thereto or optionally made integral therewith. The lower end of this lug 52 is positioned between a pair of angle bars 54 and 56. These angle bars may be welded, bolted or otherwise secured to the floor board 32 and have substantially parallel upright extending legs.

The divided car seat is operated as follows: when a person is desirous of entering the rear portion of the car so as to seat himself upon the back seat, he merely opens the door and pushes one end seat back rest 46 or 48 forwardly. This, in turn, will cause the lug 52 to impinge or abut against angle iron 56 causing either whole end seat assembly 20 or 22 to move forward with the rods 38 sliding within the retainers 40. When either back rest 46 or 48 is rotated backwards, the lugs 52 abut the angle irons 54 causing the seat to move rearwardly. A person may retain his seat on the central portion 14 while each of the sections is moved forward, allowing people to enter. Additionally, unlike the conventional divided seats, easy access may be had from the left side door since the end seat will not be stopped from moving forward or the section 46 from rotating by being held back by the steering wheel.

Since from the foregoing, the construction and advantages of this divided car seat is readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be resorted to which lie within the scope of the appended claims.

Having described the invention, what is claimed as new is:

1. A car seat comprising a seat member provided with a longitudinally extending rod secured to its front and back portions, said rod being slidably inserted in a retainer secured to a floor board of a car, a pair of upright members secured to said floor board, a back rest pivotally secured to said seat member, a lug attached to said back rest and rotatable therewith, said lug selectively abutting one of said pair of upright members to cause said seat portion to selectively slide longitudinally of an initial position upon rotation of said back rest.

2. A divided car seat comprising a central seat member secured to the floorboard of a car, a pair of end seat members disposed on either side of the central seat member, each of said end seat members being provided with a longitudinally extending rod secured to its front and back portions, said rod being slidably inserted in a retainer secured to a floorboard of a car, a pair of upright members secured to said floor board below each of said end seat members, a back rest pivotally secured to each of said end seat members having a lug attached thereto, said lug being rotatable with said back rest and selectively abutting one of said pair of upright members to cause said seat portion to selectively slide longitudinally of an initial position upon rotation of said back rest.

3. The structure of claim 2 wherein said upright members comprise parallelly disposed angle bars one leg of each being secured to the floor board.

EARL D. HADLEY.

REFERENCES CITED

The following references are of record in the file of this patent:

UNITED STATES PATENTS

| Number | Name | Date |
|---|---|---|
| 1,379,316 | Smith et al. | May 24, 1921 |
| 1,636,078 | Schreiber | July 19, 1927 |
| 2,189,396 | Greig | Feb. 6, 1940 |
| 2,288,535 | Marx | June 30, 1942 |